(12) United States Patent
Bendall et al.

(10) Patent No.: US 7,969,583 B2
(45) Date of Patent: Jun. 28, 2011

(54) SYSTEM AND METHOD TO DETERMINE AN OBJECT DISTANCE FROM A REFERENCE POINT TO A POINT ON THE OBJECT SURFACE

(75) Inventors: Clark Alexander Bendall, Syracuse, NY (US); Kevin George Harding, Niskayuna, NY (US); Guiju Song, Shanghai (CN); Li Tao, Shanghai (CN)

(73) Assignee: General Electric Company, Schenectady, NY (US)

( * ) Notice: Subject to any disclaimer, the term of this patent is extended or adjusted under 35 U.S.C. 154(b) by 511 days.

(21) Appl. No.: 12/042,800

(22) Filed: Mar. 5, 2008

(65) Prior Publication Data

US 2009/0225329 A1  Sep. 10, 2009

(51) Int. Cl.
G01B 11/14 (2006.01)
G01B 11/02 (2006.01)

(52) U.S. Cl. ......................... 356/618; 356/496
(58) Field of Classification Search .................. 356/489, 356/496, 511, 512, 505, 618
See application file for complete search history.

(56) References Cited

U.S. PATENT DOCUMENTS

| | | | |
|---|---|---|---|
| 5,069,548 A | 12/1991 | Boehnlein | |
| 5,135,308 A * | 8/1992 | Kuchel | 356/604 |
| 5,135,309 A * | 8/1992 | Kuchel et al. | 356/604 |
| 5,636,025 A * | 6/1997 | Bieman et al. | 356/619 |
| 6,088,105 A | 7/2000 | Link | |
| 6,252,623 B1 * | 6/2001 | Lu et al. | 348/47 |
| 7,170,677 B1 | 1/2007 | Bendall et al. | |
| 7,302,109 B2 | 11/2007 | Hu et al. | |
| 2004/0105100 A1 * | 6/2004 | Shirley | 356/603 |

(Continued)

OTHER PUBLICATIONS

Albert Boehnlein and Kevin Harding, "Field Shift Moire, a New Technique for Absolute Range Measurement", SPIE conference 1163, Fringe Analysis Methods, San Diego, Aug. 1989.

(Continued)

*Primary Examiner* — Patrick J Connolly
(74) *Attorney, Agent, or Firm* — Global Patent Operation; Mark A. Conkin

(57) ABSTRACT

A system for determining an object distance z includes a plurality of light emitters. A group of at least one of the plurality of light emitters includes an emitter group, and the pattern projected when one emitter group is emitting includes a fringe set. The light pattern of one fringe set exhibits a phase-shift relative to the light patterns of the other fringe sets, and the phase-shift varies as the distance from the origin of the plurality of fringe sets varies. The system further includes a processing unit that is configured to compute a ripple metric value associated with each of a plurality of possible z values. The processing unit is further configured to determine an approximated z value using the computed ripple metric values. A probe system is also provided. The probe system is configured to project a plurality of fringe sets from the probe onto an object. The light pattern of one fringe set exhibits a phase-shift relative to the light patterns of the other fringe sets, and the phase-shift varies as the distance from the origin of the plurality of fringe sets varies. The probe system is further configured to compute a ripple metric value associated with each of a plurality of possible z values, where z is an object distance. The probe system is also configured to determine an approximated z value using the computed ripple metric values. A method for determining an object distance z is also provided.

20 Claims, 11 Drawing Sheets

U.S. PATENT DOCUMENTS

| | | |
|---|---|---|
| 2005/0046872 A1 | 3/2005 | Hu et al. |
| 2005/0088529 A1* | 4/2005 | Geng .................. 348/207.99 |
| 2006/0072122 A1 | 4/2006 | Hu et al. |
| 2007/0090308 A1 | 4/2007 | Harding |
| 2007/0091320 A1 | 4/2007 | Hu et al. |

OTHER PUBLICATIONS

Leonard H. Bieman and Kevin G. Harding, "Absolute Measurement using Field Shifted Moire", SPIE Proceedings vol. 1614, Optics, Illumination and Image Sensing for Machine Vision VI, Boston, Nov. 1991.

Kevin G. Harding, Shu-Guo G. Tang, "Machine vision method for small feature measurements," Publication: Proc. SPIE vol. 5606, p. 153-160, Two- and Three-Dimensional Vision Systems for Inspection, Control, and Metrology II; Ed. (2004).

Kevin Harding, "Latest optical methods for industrial dimensional metrology,", Proc. SPIE vol. 6000, 600001, Two- and Three-Dimensional Methods for Inspection and Metrology III; Ed. (2005).

* cited by examiner

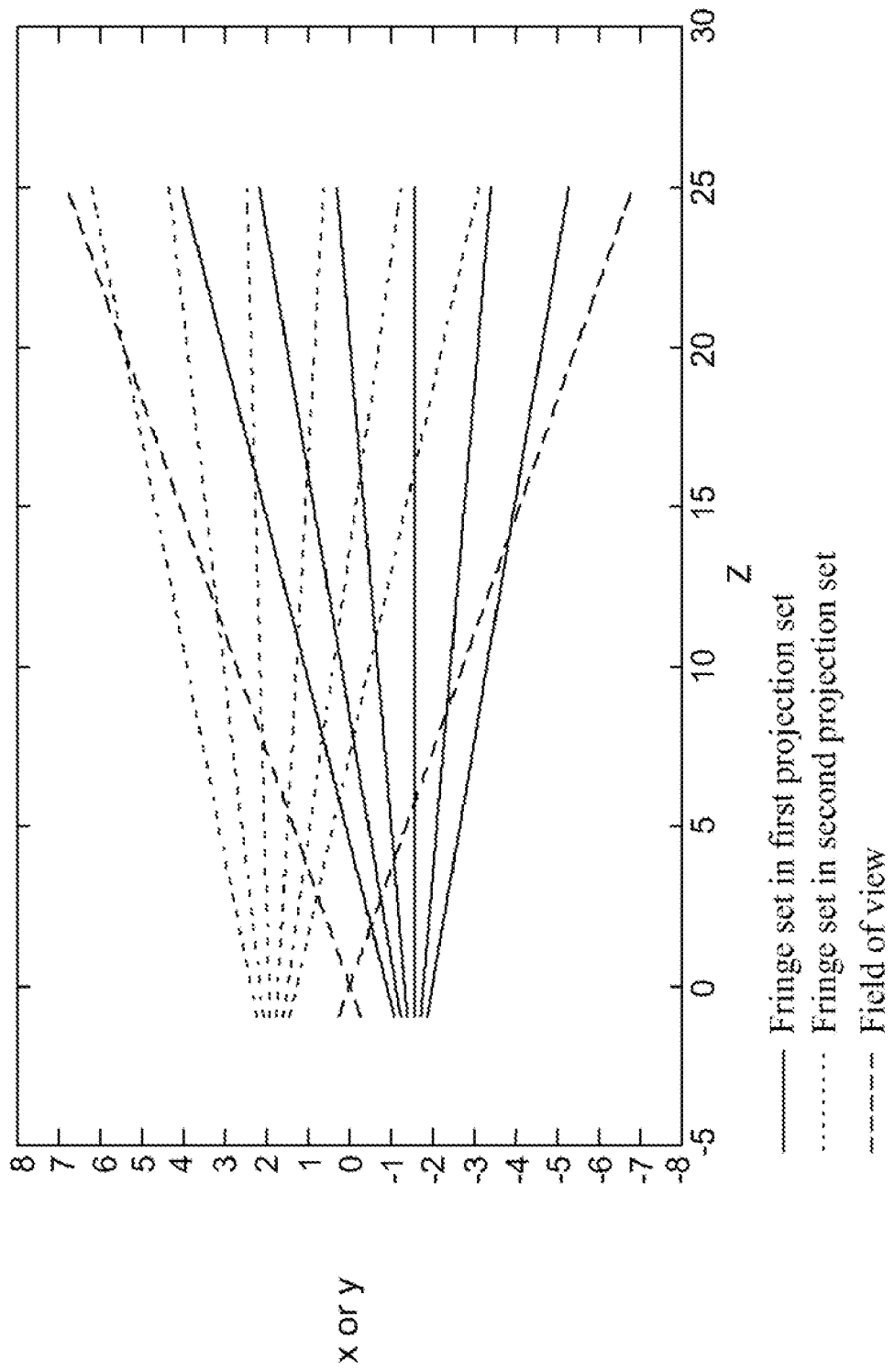

SYSTEM AND METHOD TO DETERMINE AN OBJECT DISTANCE FROM A REFERENCE POINT TO A POINT ON THE OBJECT SURFACE

BACKGROUND OF THE INVENTION

1. Field of the Invention

The subject matter described herein relates generally to borescopes and endoscopes, and more particularly, to a borescope/endoscope which uses phase-shift analysis to provide 3D surface mapping and dimensional measurement.

2. Related Art

Borescopes and endoscopes are typically used for inspection inside a remote cavity, Most borescopes/endoscopes, referred to herein as a probes, employ an external light source coupled to fiber optic bundles in the probe to provide illumination of a remote object or surface at the distal end. When the object is illuminated, an internal image is formed by a lens system on an image sensor, and the image is relayed to a connected display, such as a video screen. The image sensor may be located at the proximal end of the probe, as with an optical rigid borescope or fiberscope, or at the distal end as with a video borescope or endoscope. Such systems are often used to inspect in inaccessible locations for damage or wear or to verify that parts have been properly manufactured or assembled. Among other things, it is desirable to obtain dimensional measurements to verify that damage or wear does not exceed an operational limit or that a manufactured part or assembly meets its specifications. It may also be desirable to produce a 3D model or surface map for comparison to a reference, 3D viewing, reverse engineering, or detailed surface analysis.

The image shown on the connected display varies in magnification and apparent size depending upon the distance between the object and the distal end of the probe. This leads to difficulties in directly determining dimensional measurements, especially in three spatial dimensions.

There are a number of known approaches for providing 3D data through a probe including splitting the view to gain a stereo image (stereo viewing), projecting a coarse pattern of dots onto the remote object, or using a single line to obtain a single image profile. Stereo methods can be used to create a 3D view, but can only provide information where two points on the image can be correlated. This can be problematic when little surface detail exists. The correlation process can also require significant processing, so producing a full 3D surface map can be time consuming. It is more typical to only correlate a small number of points needed for basic measurements. Projecting a course pattern of dots permits measurement to be obtained at the points of the dots. However, the areas between the dots are left to be interpolated, so any surface variations between them are lost. Finally, a single line profile provides useful information along that single profile, but proper positioning of the single line on the object of interest can be difficult, and measurements that require non co-linear points, such as point to line or area measurements, are subject to error if the surface is not flat or the view is not perpendicular to the surface. The scanning of a single profile line that is often employed in commercial systems to build a 3D surface map is generally not practical in a small, probe due to size constraints.

Other limitations also exist regarding the approaches discussed above. For example, a large computing capacity is often required to implement the solutions, and highly skilled technicians are needed to operate the equipment. In addition, the above approaches may not be appropriate when a dense 3D full surface map or full-field object measurement is desired. Without the full-field data, imperfections on a surface or object may be missed entirely. Thus, it is desirable to provide a probe that offers full-field surface mapping.

Full-field object data can be obtained through phase-shifting. Phase-shifting is an analysis technique used for non-contact optical metrology applications. Phase-shifting typically involves projecting one or more sets of parallel lines that cross the field of view (FOV) of a camera. As the object distance changes, the parallel lines, or fringe sets, shift across the FOV. Which line is which, or absolute phase, must be determined in order to make accurate measurements and obtain an accurate surface map. The absolute phase at a given point in the image is defined as the total phase difference ($2\pi$ times the number of line periods) between a reference point in the projected line pattern and the given point. The reference point can be arbitrarily defined.

There are a number of known approaches to decipher which line is which and determine absolute phase. Some approaches include employing multiple fringe sets with physical horizontal offsets resulting in a relative phase that changes with distance or using multiple fringe sets with physical axial offsets to change the period with distance. Most techniques use additional projections. For example, to assist in determining the absolute phase, an extra line may be projected to give a starting reference point. The determined absolute phase combined with the fringe set position in the FOV are commonly used to determine absolute object distance.

Phase-shifting methods have not been practical for use in devices such as borescopes and endoscopes. The equipment required to project suitable line patterns for phase-shifting methods usually include a projector, scanner, piezo mirror, or similar item. Among other things, the size limitations of probes make the use of typical equipment mechanically challenging.

Thus, it is desirable to provide a practical mechanical configuration of a probe that is able to perform measurements and 3D surface mapping based on phase-shift analysis. It is further desirable to provide an analysis technique appropriate for the configuration that assists with fringe ordering to determine absolute phase and object distance even when complex surfaces are involved.

BRIEF DESCRIPTION OF THE INVENTION

In accordance with an embodiment of the present invention a system for determining an object distance z comprises a plurality of light emitters. A group of at least one of the plurality of light emitters comprises an emitter group, and the pattern projected when one emitter group is emitting comprises a fringe set. The light pattern of one fringe set exhibits a phase-shift relative to the light patterns of the other fringe sets, and the phase-shift varies as the distance from the origin of the plurality of fringe sets varies. The system further comprises a processing unit that is configured to compute a ripple metric value associated with each of a plurality of possible object distance z values. The processing unit is further configured to determine an approximated object distance z value using the computed ripple metric values.

In another embodiment of the invention, a probe system is configured to project a plurality of fringe sets from the probe onto an object surface. The light pattern of one fringe set exhibits a phase-shift relative to the light patterns of the other fringe sets, and the phase-shift varies as the distance from the origin of the plurality of fringe sets varies. The probe system is further configured to compute a ripple metric value associated with each of a plurality of possible object distance z values. The probe system is also configured to determine an approximated object distance z value using the computed ripple metric values.

In another embodiment of the invention, a method for determining an object distance z is provided. The method comprises projecting a plurality of fringe sets onto an object surface. The light pattern of one fringe set exhibits a phase-shift relative to the light patterns of the other fringe sets, and the phase-shift varies as the distance from the origin of the plurality of fringe sets varies. The method further comprises determining an approximated object distance z value using a computed ripple metric value.

BRIEF DESCRIPTION OF THE DRAWINGS

The following detailed description is made with reference to the accompanying drawings, in which:

FIG. 4 illustrates exemplary fringe sets where a plurality of images are shown.

FIG. 8 is a graph showing the trajectory in the z direction of the lines of one fringe set in each of a first and second exemplary projection set relative to a field of view.

FIG. 9 illustrates an exemplary projection set.

FIG. 10 is an exemplary phase ripple graph along a horizontal intensity line of an exemplary projection set where phase-shift, is assumed to equal 120".

FIG. 11 is an exemplary phase ripple graph along the same horizontal intensity line of FIG. 10 where the assumed phase-shift is 98.5°.

DETAILED DESCRIPTION OF THE PREFERRED EMBODIMENT

Figure 1:
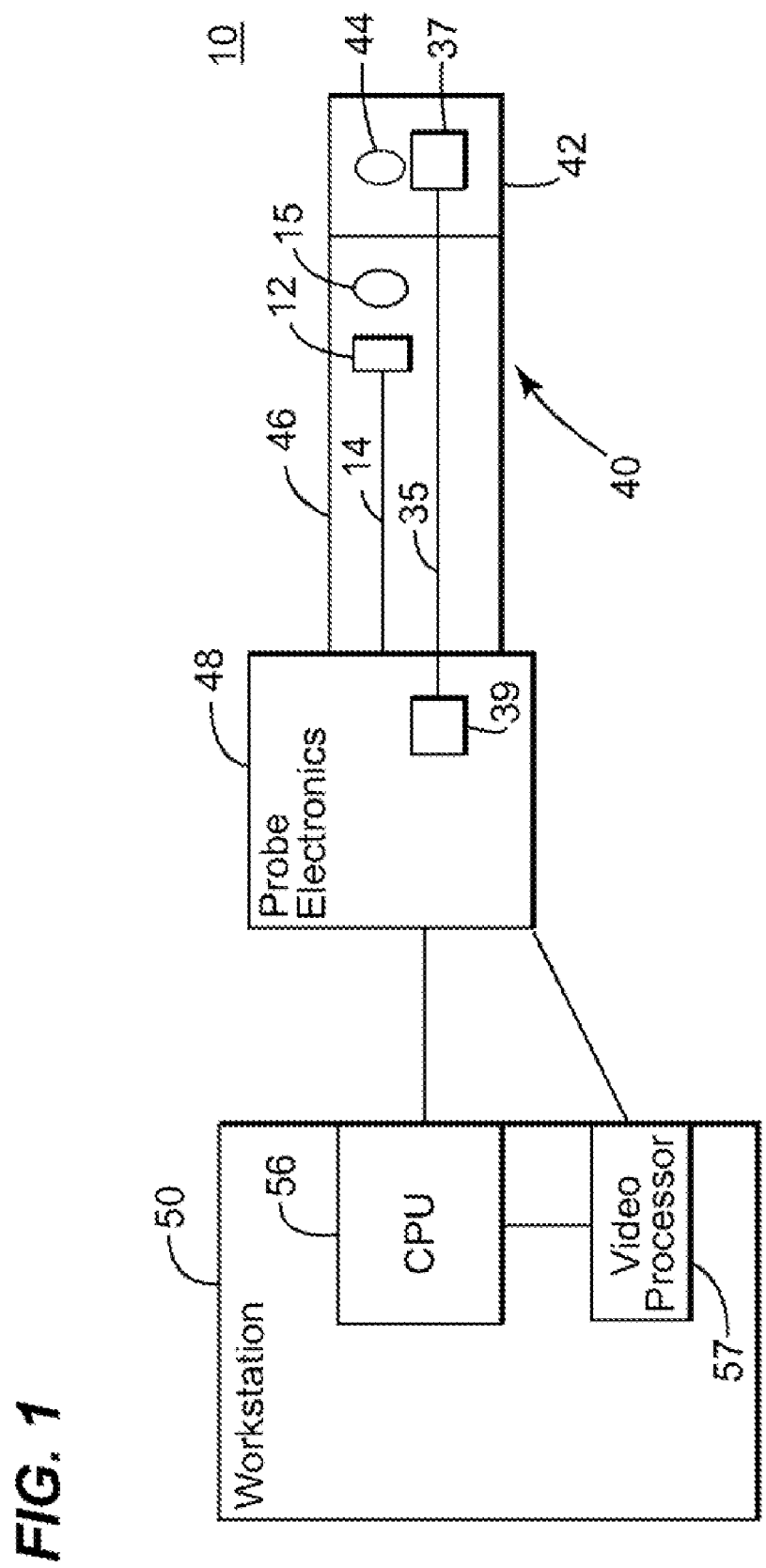
FIG. 1 is a schematic diagram of a borescope/endoscope system in accordance with an embodiment of the present invention.

Illustrated in FIG. 1, a borescope/endoscope system 10 according to an embodiment of the invention is shown. An insertion tube 40 comprises elongated portion 46 and detachable tip 42. Distal tip 42 contains viewing optics 44 which is used in combination with probe optics 15 to guide and focus light from the surface or object (not shown) onto imager 12.

The viewing optics may optionally include relay optics such as a lens or fiber optic system to remote the camera head away from the distal tip.

Imager 12 is included at the end of elongated portion 46 that is typically flexible, though it could be located proximally in other embodiments using a relay lens system or coherent fiber bundle to carry the image from the distal end to the proximal imager. Imager 12 may comprise, for example, a two-dimensional array of light-sensitive pixels that outputs a video signal in response to the light level sensed at each pixel. Imager 12 may comprise a charge-coupled device (CCD), complementary metal-oxide-semiconductor (CMOS) image sensor, or other devices of similar function. The video signal is transferred to probe electronics 48 via signal line 14. The video signal may be buffered before reaching probe electronics 48. Probe electronics 48 may be physically separated from a main control unit or central processing unit (CPU) 56 to provide more local control over probe-related operations. Among other things, probe electronics 48 comprises brightness or fringe contrast determining function 39. Alternatively, video processor 57, discussed below, may include fringe contrast determining function 39.

Video processor 57 performs various functions not limited to image capture, image enhancement, graphical overly merging, and video format conversion and stores information relating to those functions in video memory. Video processor 57 may comprise field-programmable gate array (FPGA), digital signal processor (DSP), or other processing elements and provides information to and receives information from CPU 56. The provided and received information may relate to commands, status information, video, still images, and/or graphical overlays. Video processor 57 also outputs signals to various monitors of workstation 50.

CPU 56 preferably uses both program memory and non-volatile memory, which may include removable storage devices. CPU 56 may also use volatile memory such as RAM for program execution and temporary storage. CPU 56 generates graphical overlay data for display, provides recall functions and system control, is configured to perform phase-shift analysis and measurement processing, and provides image, video, and audio storage.

System 10 further comprises at least one emitter module 37. Drive conductor 35 carries power from probe electronics 48 to emitter module 37 disposed on the distal end of insertion tube 46. Drive conductor 35 comprises one or more wires and may be incorporated with signal line 14 in a common outer jacket (not shown). Drive conductor 35 may also share conductors with signal line 14 and/or utilize the insertion tube structure for carrying current.

The at least one emitter module 37 on the distal tip 42 of insertion tube 40 may comprise, for example, at least one light emitting element or a plurality of light emitters. The at least one emitter module 37 may also comprise an intensity modulating element through which light from the at least one light emitting element or plurality of light emitters is passed to alter the distribution of light and create/project at least one structured-light pattern on the surface suitable for phase-shift analysis. Other electronics for control/sequencing of emitters, sensing temperature, and storage/retrieval of calibration data may also be disposed on the at least one emitter module 37. Detachable tip 42 at the distal end of the insertion tube 40 comprising the at least one emitter module 37 may be fixedly attached to elongated portion 46 or detachable from elongated portion 46 allowing the plurality of light emitters and the intensity modulating element to be detachable from the probe. Alternatively, the plurality of light emitters of the at least one emitter module 37 could be fixedly attached to insertion tube 40 while the intensity modulating element of the at least one emitter module 37 disposed on the distal tip 42.

The probe operates in measurement mode when at least one structured-light pattern is projected onto the surface. During measurement mode, emitter module 37 is enabled and at least one image comprising a structured-light pattern on the surface is captured. Phase-shift analysis may then be performed directly on the at least one image.

Referring to the at least one emitter module 37, light from the at least one light emitting element projects at least one structured-light pattern on the surface suitable for phase-shift analysis. The structured-light pattern preferably comprises parallel light and dark lines comprising sinusoidal intensity profiles. Line patterns having square, trapezoidal, triangular, or other profiles may be projected on the surface as well when used with appropriate phase-shift analysis to determine phase of the pattern. The pattern may also comprise other than straight, parallel lines. For example, curved lines, wavy lines, zigzagging lines, or other such patterns may be used with appropriate analysis.

The structured-light pattern projected from the at least one emitter module 37 may be created a number of ways. The at least one light emitting element may be formed to include appropriate parallel light and dark lines. A plurality of light emitters may be positioned strategically to form a structured-light pattern on the surface. Alternatively, light from the at least one emitting element may be passed through an intensity modulating element, described above. In an embodiment of the present invention, the intensity modulating element comprises a line grating, which creates a structured-light pattern when light from the at least one emitting element passes through to the surface.

In an embodiment of the present invention, emitter module 37 comprises a plurality of light emitters. A fringe set comprises a structured-light pattern projected when one emitter group comprising a group of at least one of a plurality of light emitters is emitting light. The plurality of light emitters of emitter module 37 are positioned such that the structured-light pattern projected when one group of at least one light emitter is emitting exhibits a spatial or phase-shift relative to the structured-light patterns projected when other groups of at least one light emitter are emitting. In other words, the structured-light pattern of one fringe set exhibits a spatial or phase-shift relative to the structured-light patterns of other fringe sets.

Furthermore, when projecting lines for phase-shift analysis, it is preferable for at least three structured-light patterns to be projected on the surface. The at least three structured-light patterns are ideally ⅓ period offset from each other along the axis perpendicular to the grating lines resulting in a 120° phase-shift between fringe sets. In applications where physical movement is difficult or impossible, the light emitters can be arranged to be physically offset by ⅓ period behind the line grating. Offsetting the emitters by ⅔ period, or, more generally, n/3 periods where n is an integer that is not a multiple of three, can also produce the desired fringe set phase-shift of approximately 120°.

Figure 2:
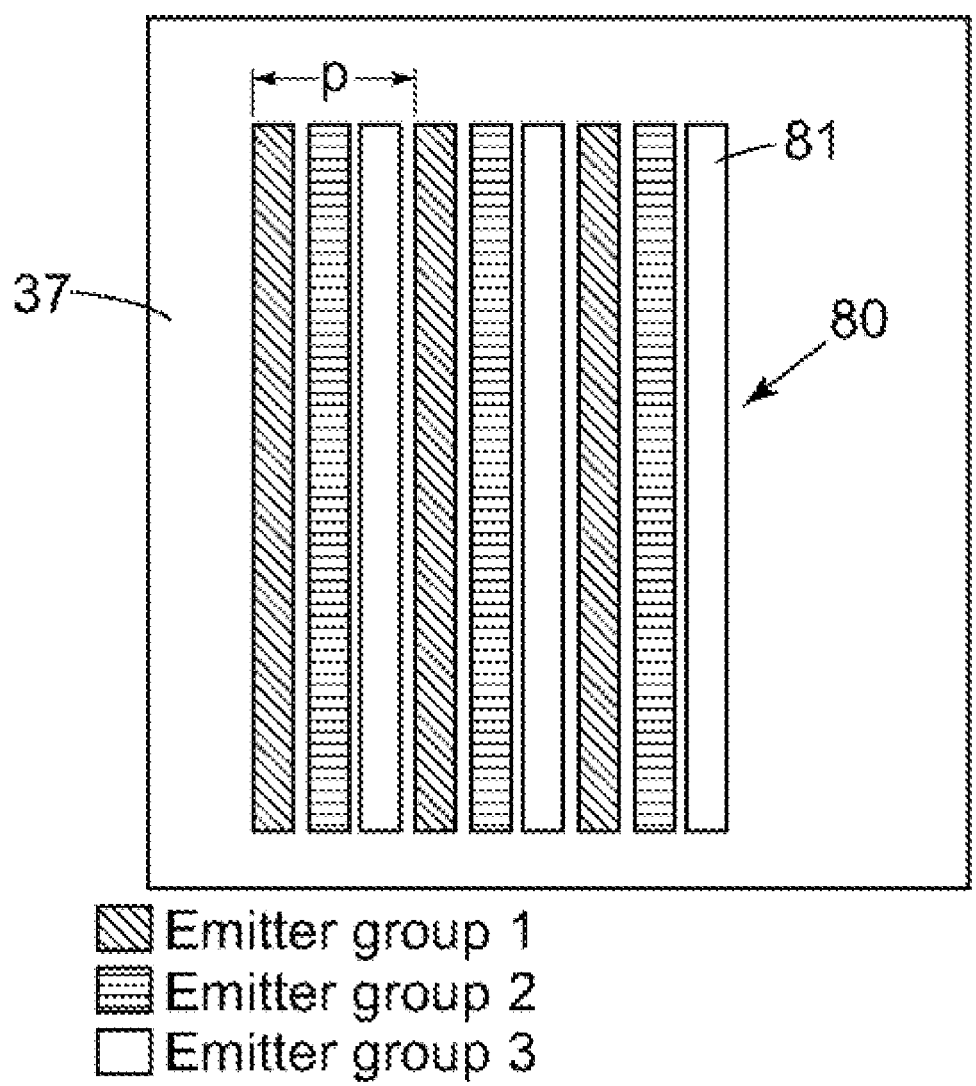
FIG. 2 is top view of an emitter array comprising emitter groups on an emitter module made using elongated die.

FIG. 2 illustrates an exemplary case when a plurality light emitters on the at least one emitter module 37 are physically offset. In FIG. 2, the line grating (not shown) has a grating period p. Each emitter 81 is lined up adjacent to each other with a center-to-center spacing of p/3. In this configuration, the line pattern projected when one emitter 81 is emitting has a phase-shift of approximately 120° relative to the line pattern projected when an adjacent emitter 81 is emitting. When the light emitters are physically offset, however, phase-shift varies as the distance from the plurality of light emitters varies. In other words, the phase-shift varies as the distance from the origin of the light patterns varies. This can be seen in the exemplary ease of FIG. 5 where the trajectory of three fringe sets along the z direction is shown. The phase-shift close to the emitter module is significantly less than 120°, and as the distance from the emitter module increases, the phase-shift between the three fringe sets also increases approaching 120° at large distances.

The absolute phase of a fringe set can be used to determine absolute distance or, more generally, an object distance (z), which is typically the distance between a reference point and a point on the surface along a reference z-axis. The reference z axis and reference point may be arbitrarily defined, though the center of the FOV is often used as the reference axis, and the point at which this axis intersects the principle plane of the viewing optics is often used as the reference point (x,y,z=0, 0,0). In order to determine object distance z and generate a surface map, the plurality of light emitters are positioned such that the phase-shift is compatible with phase-shift analysis. Preferably the center-to-center spacing between each emitter is ⅓ grating period apart along the axis perpendicular to the grating lines.

Referring back to FIG. 2, multiple emitters are spaced apart by one grating period to create three separate emitter groups. For clarification only, the emitters that, comprise each of the three emitter groups in FIG. 2 are indicated with a different pattern. In FIG. 2, emitter array 80 comprises individual emitters 81 of the same color. However, the color of emitters comprising one emitter group can differ from the emitters comprising other emitter groups.

The plurality of Sight emitters comprising an emitter group are spaced apart along the axis perpendicular to the lines on the line grating by a distance equal to an integer number of periods of the line grating. As a result, when the plurality of light emitters comprising one emitter group are simultaneously emitting light, the structured-light patterns produced by each of the multiple emitters sum together. This forms a brighter line pattern than would be generated by a single emitter element.

When multiple emitters comprising an emitter group are simultaneously emitting, the individual fringe sets are offset by a constant distance (one grating period p as shown in the exemplary case of FIG. 2) rather than a constant phase, so their phases become more aligned as they expand. This results in progressively higher contrast as distance from the grating increases. Thus, when measuring a surface where more intensity is needed to achieve low image noise, multiple emitters from the same emitter group can be simultaneously turned on to provide more brightness at high contrast. However, at close distances, the sinusoidal intensities are not phase aligned and fringe set contrast decreases. Also, less intensity is needed at close distances, so when viewing a closer surface, one emitter can be turned on to achieve adequate intensity and high contrast.

Depending on the evaluation from brightness determining function 39, one light emitter or multiple light emitters in each emitter group are enabled for each fringe set. In an embodiment of the present invention, drive conductor 35 comprises one or more drive wires (not shown) per emitter. Brightness determining function 39 selectively transmits current through specific drive wires of drive conductor 35 to light an appropriate number of emitters per fringe set. Further control over brightness can be achieved by varying the drive level applied to the emitters.

Through the use of multiple emitters per fringe set and brightness determining function 39, emitter array 80 offers adequate brightness and contrast during image capture and measurement. Emitter array 80 also offers consistent, uniform illumination, no speckling, and fast switching between fringe sets. Fast switching allows fringe set images to be captured in sequential frames, which reduces the likelihood of motion between image capture times. For at least these reasons, light emitting diode (LED) arrays are practical in this configuration. In an embodiment of the present invention, the plurality of light emitters comprise light emitting diodes. However, any light emitting source(s) offering the qualities mentioned above are sufficient for use in borescope/endoscope system 10. Other such light sources include, but are not limited to, organic LEDs, plasma elements, and laser arrays.

Phase-shift analysis is typically performed on image data sets derived from captured images. The image data sets used for the analysis may comprise, for example, a luminance component extracted from a YCrCb or RGB source image. Any component having a value that is proportional to the intensity of the periodic pattern captured in the source image may be used. For simplification, an image or images as referred to herein will be understood to comprise any source image or component derived from a source image.

Phase-shift analysis is an analytical approach, which includes a step of determining the fractional position within a periodic pattern of a point in an image. This fractional position is typically referred to as wrapped phase and has a range of 0 to $2\pi$ radians. An identical wrapped phase value can exist at multiple image points because wrapped phase ranges from 0 to $2\pi$ across each cycle of the periodic pattern. Although the following discussion describes computing wrapped phase for a set of three images having nominal phase-shifts of 120°, the same principles may be applied to image sets having more or fewer images and different nominal phase-shifts.

As mentioned above and shown in FIG. 5, when the light emitters are physically offset, the phase-shift varies as the distance between the plurality of light emitters and the surface varies. This results in phase ripple at twice the fringe frequency when phase is calculated using the standard 3-bucket equation:

$$\text{Wrapped Phase}(x, y) = \arctan2\left(\frac{\sqrt{3} * (I_0(x, y) - I_2(x, y))}{2 * I_1(x, y) - I_0(x, y) - I_2(x, y)}\right) \quad \text{(Equation 1)}$$

where:
$I_0(x,y)$ is a first image intensity value at pixel column x and pixel row y;
$I_1(x,y)$ is a second image intensity value at pixel column x and pixel row y;
$I_2(x,y)$ is a third image intensity value at pixel column x and pixel row y; and
the Wrapped Phase result is representative of the modulo $2\pi$ wrapped phase of the fringe set associated with the $I_1$ value.

Note that the designation of the $I_0$, $I_1$, and $I_2$ values is arbitrary but can affect the phase slope. Also, Equation 1 computes the wrapped phase of the fringe set associated with the $I_1$ image when the phases of the $I_0$ and $I_2$ images are symmetrical relative to $I_1$.

Phase ripple is defined as the error in the computed wrapped phase caused by a difference between the actual phase-shift and the phase-shift assumed in the calculation of wrapped phase. The magnitude of phase ripple is proportional to the difference between the actual phase-shift and the assumed phase-shift.

In an embodiment of the present invention, phase ripple is minimized or eliminated by properly compensating Equation 1 using the known physical positions of the grating and the plurality of light emitters and the surface's distance from the grating. By computing phase assuming different distances and analyzing the resulting amount of phase ripple, a rough estimate is made by choosing the distance that minimizes phase ripple. This estimate is then used for determining which fringe line is which or absolute phase—helpful in the determination of absolute measurements and 3D surface mapping.

Figure 3:
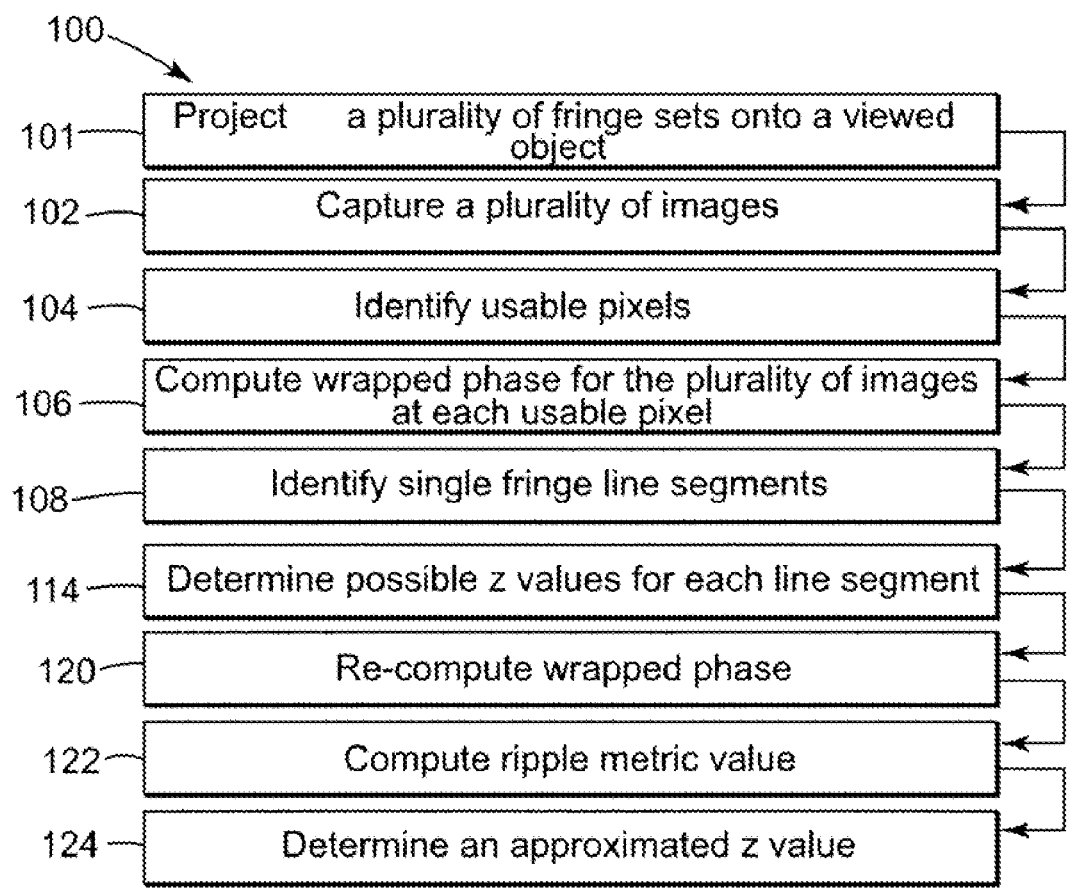
FIG. 3 is a flow chart illustrating the method in accordance with an embodiment of the present invention.

FIG. 3 is a flow chart illustrating the steps involved in the present method 100. Borescope/endoscope or probe system 10 shown in FIG. 1 is configured to perform the steps indicated in method 100. Phase-shift analysis begins at step 104 and may be carried out by CPU 56 shown in FIG. 1 or by a separate or unattached processing unit. Therefore, this method of phase-shift analysis for determining an object distance z is not limited to analyzing structured-light patterns projected from a probe. Rather, this method may be implemented to analyze structured-light patterns or fringe sets compatible with phase-shift analysis projected from any light source, so long as the phase-shift between the projected fringe sets changes with distance. For example, this method could be implemented in a bench top system using LEDs, laser diodes, illuminated fiber bundles, or other relatively compact light emitters behind a line grating to project the fringe sets, an off-the-shelf camera system for capturing images, and an off-the-shelf computer for performing the phase-shift analysis and ripple analysis.

Method 100 includes projecting a plurality of fringe sets from a probe onto an object at step 101, capturing a plurality of images at step 102, and identifying usable pixels from the images at step 104. At step 106, the wrapped phase is computed at each usable pixel. Referring to step 108, at least, one fringe line segment is identified, and at step 114, the possible z values for each fringe line segment are determined. The wrapped phase values for the pixels in the fringe line segments are re-computed at step 120. At step 122, a ripple metric value is computed, and at step 124 an approximated z value is determined using the ripple metric value.

The method 100, according to an embodiment of the present invention, is discussed in detail below. The method 100 includes projecting a plurality of fringe sets from a probe onto an object at step 101. The light pattern of one fringe set exhibits a phase-shift relative to the light patterns of the other fringe sets. In an embodiment of the present invention, the phase-shift between the plurality of projected light patterns or fringes varies with the distance from the origin of the plurality of fringe sets, as discussed above. At step 102, a plurality of images are captured. In an embodiment of the present invention, the plurality of images are captured where one fringe set is projected onto the object per image.

FIG. 4 illustrates exemplary fringe sets where a plurality of images are shown. FIGS. 4A, 4B, and 4C comprise images 0, 1, and 2, respectively. Images 0, 1, and 2 each comprise one fringe set. Image 0 of FIG. 4A is an image when fringe set 0 is projected, Image 1 of FIG. 4B is an image when fringe set 1 is projected, and Image 2 of FIG. 4C is an image when fringe set 2 is projected. FIG. 4D represents a graph of the intensities of Images 0, 1, and 2 along highlighted horizontal intensity line 328. In FIG. 4, each fringe set is shifted by approximately ⅓ of the line period. Due to the line periodicity, a shift of approximately p/3 line periods, where p is an integer that is not a multiple of 3, is effectively equal to a shift of approximately ⅓ of the line period. Other phase-shifts and numbers of fringe sets may also be used as long as they are compatible with phase-shift analysis. For example, four fringe sets each offset by approximately p/4 line periods, where p is an integer that is not a multiple of 4 could similarly be used.

Figure 4A:
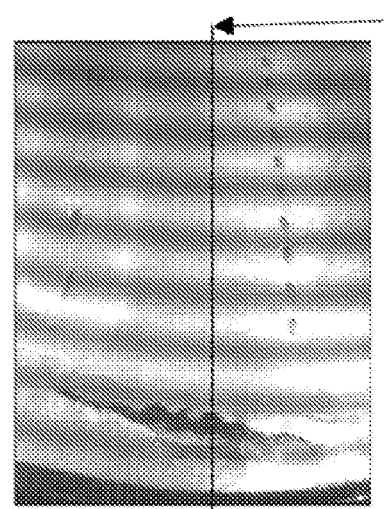
FIGS. 4A, 4B, and 4C comprises Images 0, 1, and 2, respectively.
Figure 4B:
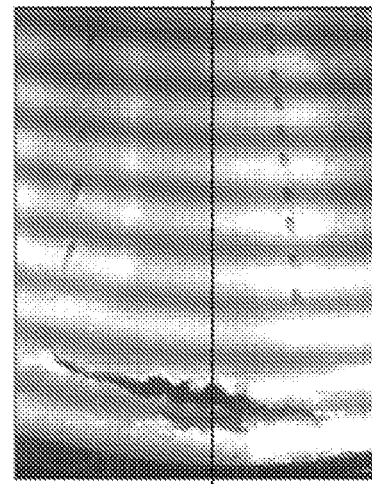
Figure 4C:
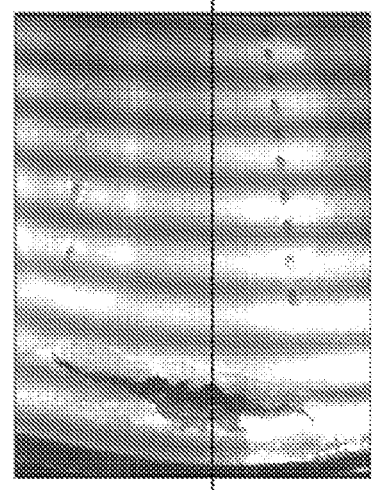
Figure 4D:
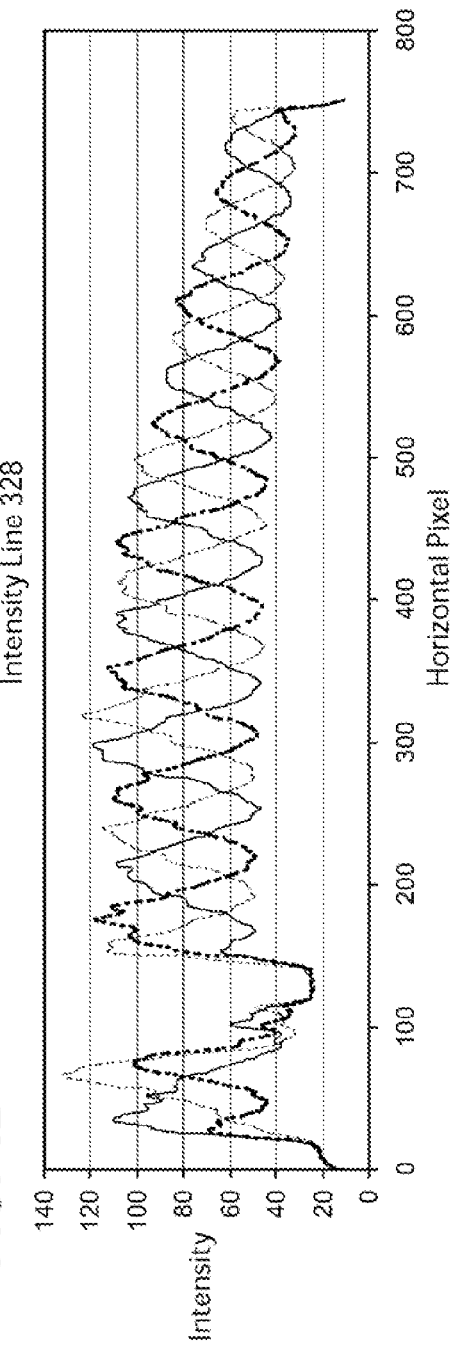
FIG. 4D represents a graph of the intensities of images 0, 1, and 2 along highlighted horizontal intensity line 328.
Figure 5:
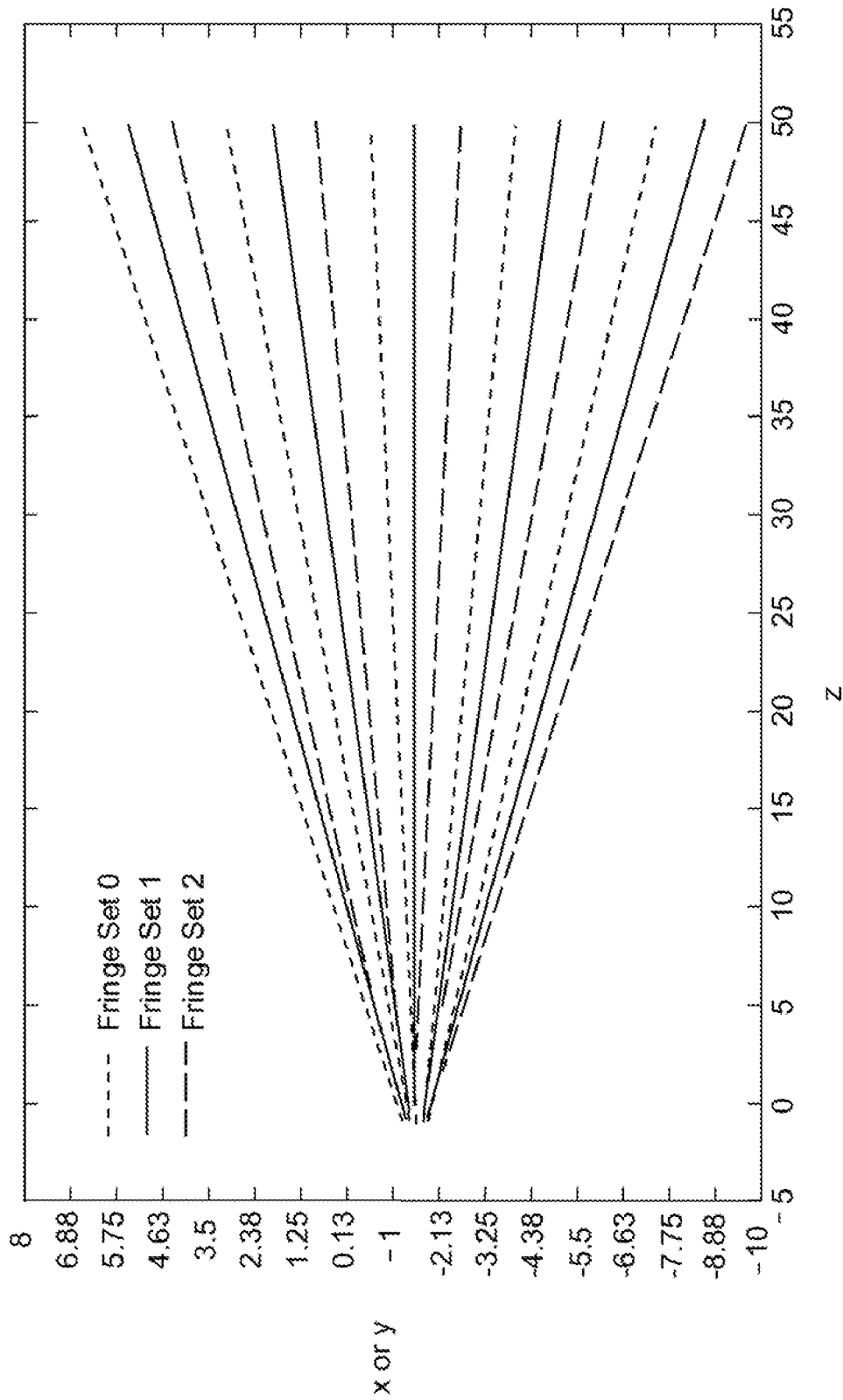
FIG. 5 is a graph showing the trajectory in the z direction of the lines of three exemplary fringe sets.
Figure 6A:
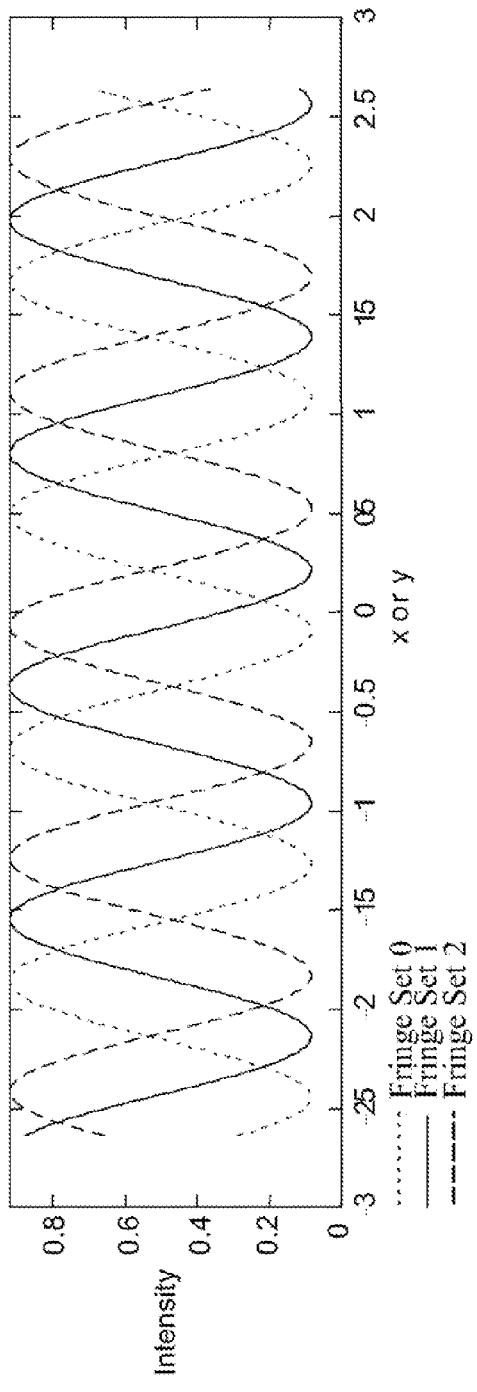
FIG. 6A plots the intensity level at a distance z close to the grating, and FIG. 6B plots the intensity level at a distance z far from the grating.
Figure 6B:
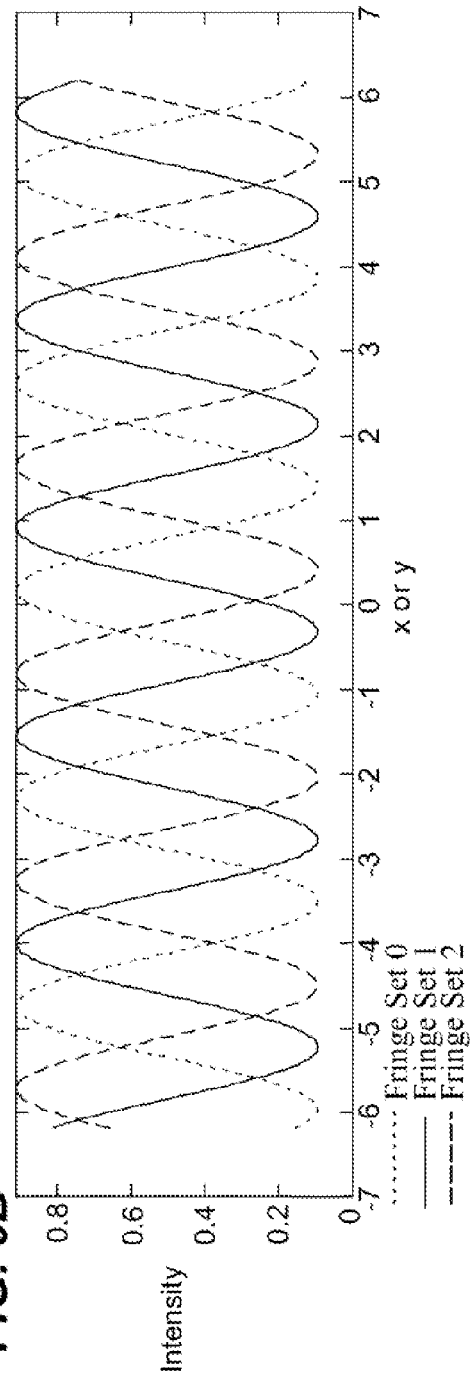
FIG. 6 is a stacked graph plotting the intensity level along a line perpendicular to the fringe lines of the exemplary fringe sets of FIG. 5.

FIG. 5 shows the trajectory in the z direction of the lines of three exemplary fringe sets. In FIG. 5, lines of the same pattern comprise a fringe set. FIGS. 6A and 6B combine the lines of FIG. 5 that form each of the three fringe sets. Like FIG. 4D, FIGS. 6A and 6B plot intensity level along a line perpendicular to the fringe lines of the exemplary fringe sets of FIG. 5. However, FIG. 6A plots the intensity level at a distance z close to the grating, and FIG. 6B plots the intensity level at a distance z far from the grating. Generally in FIG. 6A, it can be seen that at close distances the fringe sets have less than a 120° phase-shift, whereas FIG. 6B shows that at far distances fringe sets have approximately a 120° phase-shift.

Fringe sets are preferably offset by 120° for phase-shift analysis because the phase error caused by a given level of image noise is minimized. However, as mentioned above, the physical light source and grating configuration that is practical for implementation in a probe causes a varying spatial offset as the distance between the grating and the surface varies. The method of phase-shift analysis discussed here takes advantage of this feet to determine absolute phase and, thus, absolute measurements.

Figure 7:
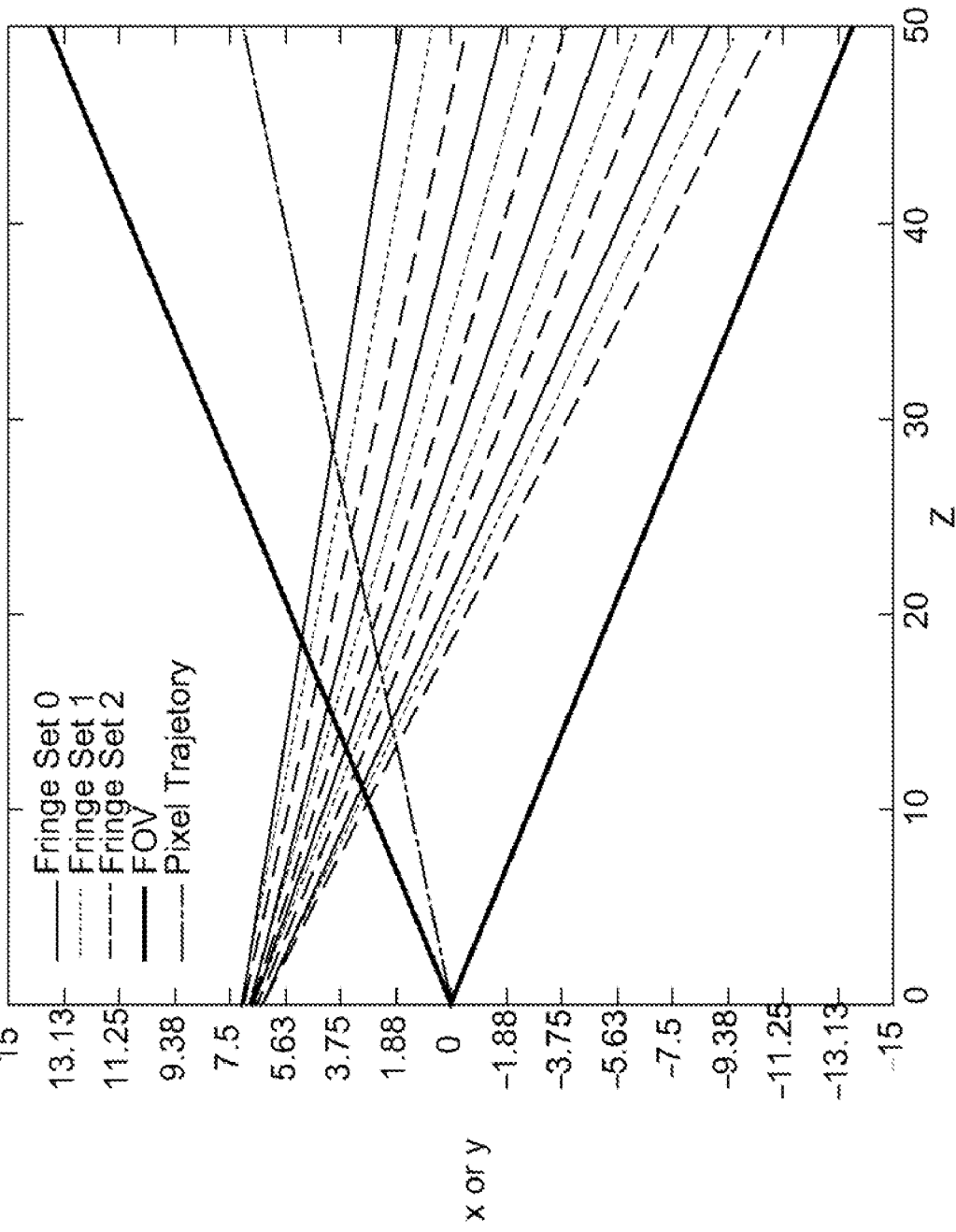
FIG. 7 is a graph showing the trajectory of an exemplary projection set projected from one side of the FOV.

In an embodiment of the present invention, a first projection set is projected from one side of the FOV and a second projection set is projected from the other side of the FOV. A projection set comprises at least one fringe set comprising a structured-light pattern. For example fringe sets 0, 1 and 2 of FIG. 7 comprise an exemplary projection set. In the case of FIG. 7, a plurality of fringe sets comprise the projection set. When a projection set comprises a plurality of fringe sets, the plurality of fringe sets comprising the projection set are typically projection from approximately the same origin relative to the FOV.

To further illustrate this, FIG. 8 shows a graph of two fringe sets. Each fringe set is a projection from opposite sides of the FOV. The fringe set in FIG. 8 represented by the solid lines projected from one side of the FOV comprises a first projection set, while the fringe set in FIG. 8 represented by the dashed lines projected from the other side of the FOV comprises a second projection set. Regarding the exemplary case of FIG. 8, only one fringe set per each projection set is shown; however a plurality of fringe sets may comprise each projection set. In an embodiment of the invention, a projection set comprises a plurality of fringe sets, each fringe set comprising a structured-light pattern, wherein the light pattern of one fringe set exhibits a phase-shift relative to the light patterns of the other fringe sets, and wherein the phase-shift varies as the distance from the origin of the light patterns varies.

When a first projection set is produced from one side of the FOV, and a second projection set is produced from the other side of the FOV, phase-shift analysis is performed on the a plurality of images, each image set comprising images of one projection set where one fringe set is projected onto the surface per image. Furthermore, z values are determined using the difference between the computed phases and the physical geometry of the probe including the viewing and projection systems. Accuracy is improved when the distance between the two projection origins is larger than the distance between the FOV and one projection origin.

Referring back to method 100, at step 104, usable pixels are identified. Areas are masked that are too bright, too dark, or have insufficient modulation. At step 106, the wrapped phase is computed for the usable pixels in the plurality of images. Specifically, the wrapped phase is computed at each usable pixel along each horizontal intensity line. The wrapped phase is computed by using a phase-shift value based on an assumed z value. Any value approximating z can be assumed, and wrapped phase results in a number between 0 and $2\pi$.

$$\text{Wrapped Phase}(x, y) = \qquad \text{(Equation 2)}$$

$$\arctan2\left(\frac{F(x, y, z) * (I_0(x, y) - I_2(x, y))}{2 * I_1(x, y) - I_0(x, y) - I_2(x, y)}\right)$$

$$\text{where: } F(x, y, z) = \frac{1 - \cos(\text{phase\_shift}(x, y, z))}{\sin(\text{phase\_shift}(x, y, z))}; \text{ and}$$

phase_shift(x, y, z) = phase difference between lines at z, pixel column x, and pixel row y − based on emitter, grating, and camera geometries.

Similar to Equation 1, Equation 2 computes the wrapped phase of the fringe set associated with the $I_1$ image when the phases of the $I_0$ and $I_2$ images are symmetrical relative to $I_1$.

Further, at step 108, on each row of the wrapped phase map created with the values calculated in step 106, single fringe line segments having no abrupt changes in wrapped phase are identified. The fringe line segments identified in this step are sections of pixels that are located on continuous sections of the surface. However, fringe line segments that are located on discontinuous sections of the surfaces can also be identified. Typically, fringe line segments on continuous sections comprise a wrapped phase range from 0 to $2\pi$ where the wrapped phase ramps linearly through this range and a smooth relative phase. In contrast, fringe line segments on discontinuous sections comprise a wrapped phase spanning less than the 0 to $2\pi$ range or an abrupt change in wrapped phase.

Figure 9A:
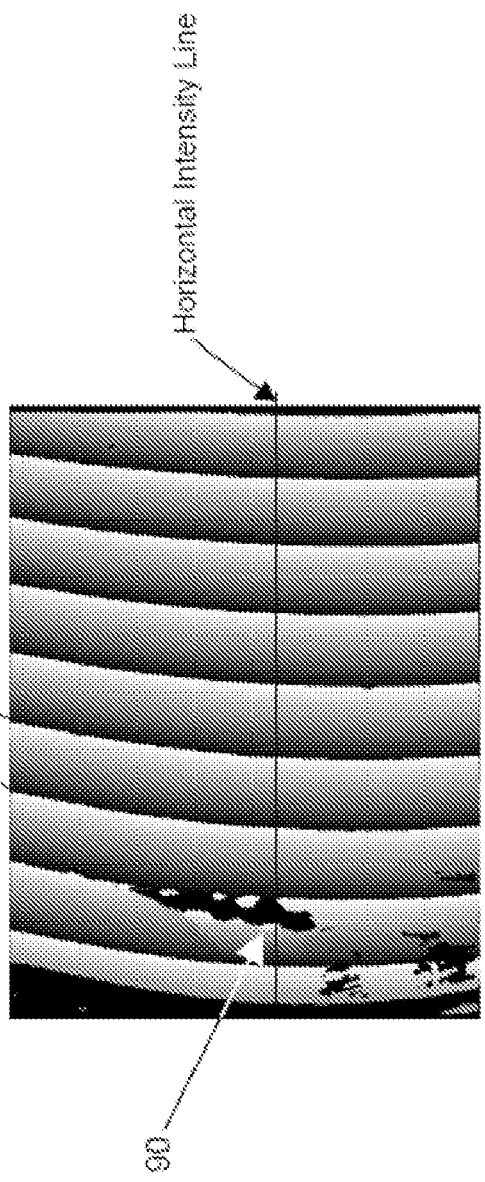
FIG. 9A is an image of the exemplary projection set.

FIG. 9A is a digitized image of an exemplary projection set showing the computed wrapped phase on a turbine blade. In FIG. 9A, a 0-phase to $2\pi$-phase range is indicated as the beginning of one dark line to the beginning of the next dark line on the digitized image. On continuous surfaces, the wrapped phase of all of the fringe line segments ramps linearly through the 0 to $2\pi$ range. However, fringe line segments located on a discontinuous area, such as discontinuity 90 in FIG. 9A, usually have a non-linear wrapped phase or have gaps in the 0 to $2\pi$ range. In some areas, the projected patterns may not be reflected with sufficient intensity to yield accurate results. Such unusable areas are shown in FIG. 9A as a black area and may be masked to inhibit further processing. Discontinuity 90 is one such area.

Figure 9B:
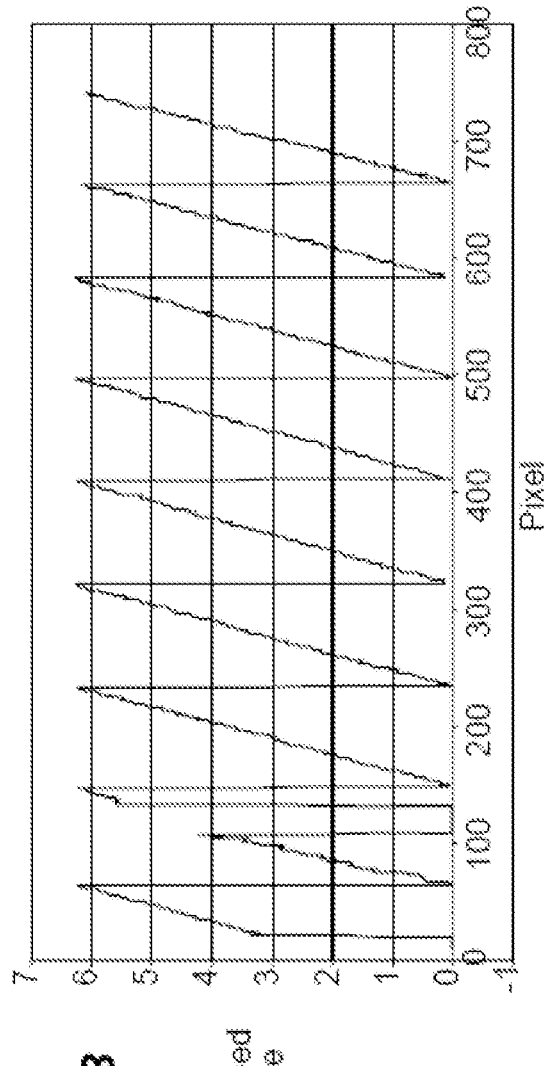
FIG. 9B is a graph of the wrapped phase of the of the exemplary projection set versus pixels of the horizontal intensity line shown in FIG. 9A.

FIG. 9B is a graph that shows the wrapped phase of FIG. 9A versus pixels of the horizontal intensity line. The effect on the wrapped phase caused by discontinuity 90 can be seen around pixel 100 in FIG. 9B. Around pixel 100, the wrapped phase changes abruptly. An unusable area is also present where insufficient fringe intensity was detected. A gap in the 0 to $2\pi$ range exists in this unusable area. Alternatively, around pixel 600, the surface is continuous and, therefore, no abrupt changes in the wrapped phase exists. Here, the wrapped phase of the fringe line segments vary linearly from 0 to $2\pi$.

Mentioned above, FIG. 7 illustrates the trajectory in the z direction of the lines of a projection set relative to a field of view. Seen in FIG. 7, as the distance z from the origin of the light patterns varies, so does the phase between the shown fringe sets. As illustrated in FIG. 7, the positions of the projected fringe lines relative to the FOV change as distance z changes. The lines comprising fringe set 1 in FIG. 7 represent positions at which the computed wrapped phase value would be 0. Between these lines, the wrapped phase would ramp from 0 to $2\pi$. Also illustrated in FIG. 7 is a line in the FOV that would be associated with an individual pixel of imager 12 referred to as a pixel trajectory. Seen in FIG. 7, the pixel trajectory crosses multiple fringe lines at different distances z. Because of this, a given wrapped phase value can be associated with multiple possible z values.

At step 114, the possible z values are determined for the wrapped phase values computed at step 106. Discussed above, multiple possible z values are commonly associated with a given wrapped phase value. Step 114 utilizes calibration parameters describing the camera and projection systems to determine the possible z values. Step 114 may also include a sub-step in which a single set of possible z values is determined for a plurality of pixels, which may comprise a fringe line segment or multiple fringe line segments, to simplify subsequent processing.

The absolute phase associated with each of the possible z values (determined at step 114) may also be determined to limit the number of those possible values. The number of possible z values are limited by determining which absolute phase values are possible considering known probe geometry. In the configuration wherein the fringe lines are nominally vertical in the images and the absolute phase is increasing from left to right, absolute phase along a single horizontal line must monotonically increase from left to right. For example, an absolute phase of zero may be defined as being the center of the bright portion of the left-most projected line. The centers of the bright portions of the next lines moving to the right would then have absolute phases of $2\pi$, $4\pi$, $6\pi$, etc. A fringe set would contain a limited number of fringe lines and therefore a limited range of absolute phase values. Therefore, if the absolute phase value computed for a z value would require that the absolute phase of another pixel along the same horizontal line be outside the possible absolute phase range, that z value is no longer considered a possible solution.

For example, if there are 8 lines in a projection set with the leftmost having an absolute phase of 0, the possible absolute phase range is 0 to $16\pi$. If a possible z value for a point near the left side of the image is associated with an absolute phase of $8\pi$, and there are five fringe lines present to the right of that point, that would imply that the rightmost line has an absolute phase of $18\pi$. Because $18°$ is outside of the possible range, that possible z value would be discarded.

At step 120, the phase-shift associated with each of the plurality of possible z values, is used to re-compute the wrapped phase associated with each of the plurality of possible z values. This is done for at least a portion of the fringe Sine segments. At step 122, a ripple metric value is determined for each of the plurality of possible z values. The ripple metric value can be any value or combination of values which is indicative of the amount of phase ripple present in a wrapped phase data set wherein the phase ripple varies based on a z value used in the computation of the wrapped phase data set values.

In one embodiment, an equation is defined that predicts wrapped phase along each fringe line segment for which the wrapped phase was re-computed. This equation can be determined by performing a curve fit or slope estimate on the re-computed wrapped phase. A second order curve fit is preferred as it is more accommodating of curved surfaces than a first-order equation. Higher-order equations are generally not used as they can follow the phase ripple that is being assessed.

Ripple magnitude may be computed for each pixel located on the fringe line segments for which wrapped phases were re-computed. The ripple magnitude is determined from the difference between the re-computed wrapped phase and the predicted wrapped phase for a z value. A ripple metric value is then determined from one or more ripple magnitude values. These steps are repeated for each possible z value, so there is a curve fit equation and a ripple metric value generated for each possible z value.

To compute ripple magnitude, a curve fit is performed for each of the plurality of possible z values, the curve fit predicting wrapped phase. Pixel coordinates from the plurality of images are plugged into a curve fit equation that predicts wrapped phase at a given pixel coordinate. For example, pixel column values x on a line segment are plugged into a curve fit equation for that line segment to obtain the predicted wrapped phase for that pixel. In alternative configurations, and with different curve fit equations, the wrapped phase may be predicted for pixel row values y. In both cases, wrapped phase values are predicted for a plurality of possible z values by a curve fit equation. The predicted wrapped phase value is then compared to the re-computed wrapped phase value for the same pixel. The difference between the predicted wrapped phase and the re-computed wrapped phase for a particular pixel is the ripple magnitude for that particular pixel.

A ripple metric value is then computed by determining a difference between the predicted wrapped phase and computed (re-computed) wrapped phase. One possible way to compute the ripple metric value for a possible z value is to sum the ripple magnitudes of all the pixels for which the wrapped phase was re-computed for that possible z value. Another way to compute the ripple metric value for a possible z value would be to count the number of pixels whose ripple magnitude is lower at that possible z value than at any other possible z value.

In another embodiment, the ripple metric value can be determined using a frequency-domain analysis on the computed wrapped phase associated with each of the plurality of possible z values. The phase ripple that exists in the wrapped phase calculated using incorrect z values has a period that is one half of the width of one fringe line, as illustrated in FIGS. 10 and 11. In other words, if one fringe line, represented by 0 to $2\pi$ wrapped phase range, is 100 pixels wide, the period of the phase ripple would be about 50 pixels. So, in the frequency domain, the amplitude of the frequency component associated with a 50 pixel period would be indicative of the amount of phase ripple and could be used as the ripple metric value. This amplitude could be determined using a variety of methods such as a Fourier Transform, a band-pass filter, or an analysis of the derivative of the wrapped phase.

When determining a ripple metric value using any of the described approaches, it may be desirable to first remove the $2\pi$ jumps in the wrapped phase to allow curve fitting over a larger area or to remove the effects of the jumps from the frequency-domain results. Furthermore, for the curve fitting approach, other curve fit equations may be determined that predict other phase values including, but not limited to unwrapped phase and/or absolute phase. In those cases, the ripple metric value is computed by determining a difference between the predicted phase values and computed phase values, wherein the computed phase values are derived from the computed (re-computed) wrapped phase associated with each of the plurality of possible z values. In general, a set of computed phase values may be derived from the computed wrapped phase associated with each of the plurality of possible z values to simplify or otherwise improve the determination of the ripple metric value.

At step 124 an approximated z value is determined by selecting the possible z value that yielded the ripple metric value indicative of the least amount of phase ripple. Therefore, the approximated z value is determined using the computed ripple metric values discussed above.

Figure 10A:
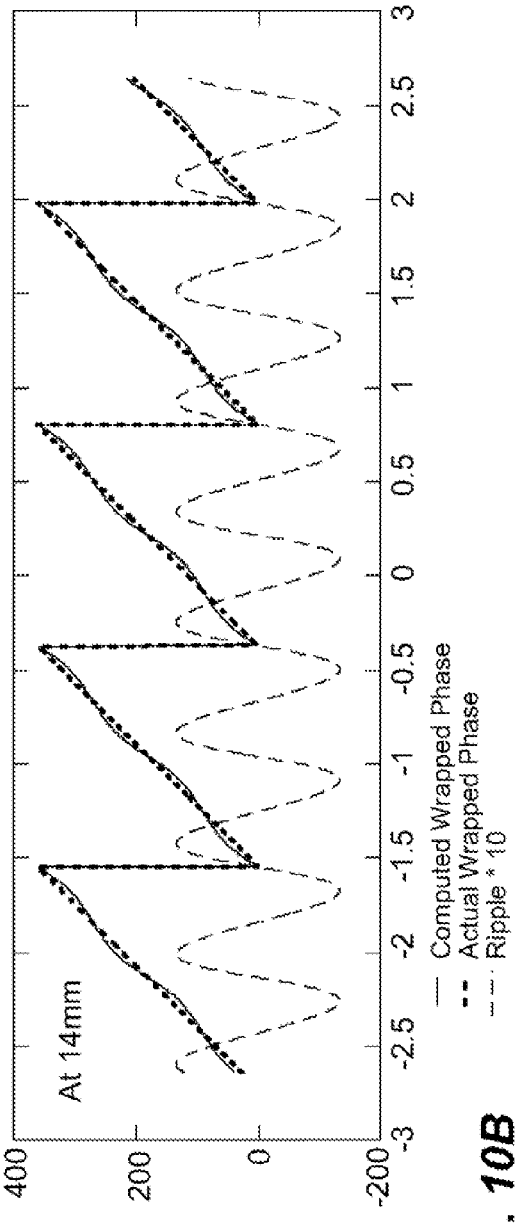
FIG. 10A is the graph at the z value of 14 mm.
Figure 10B:
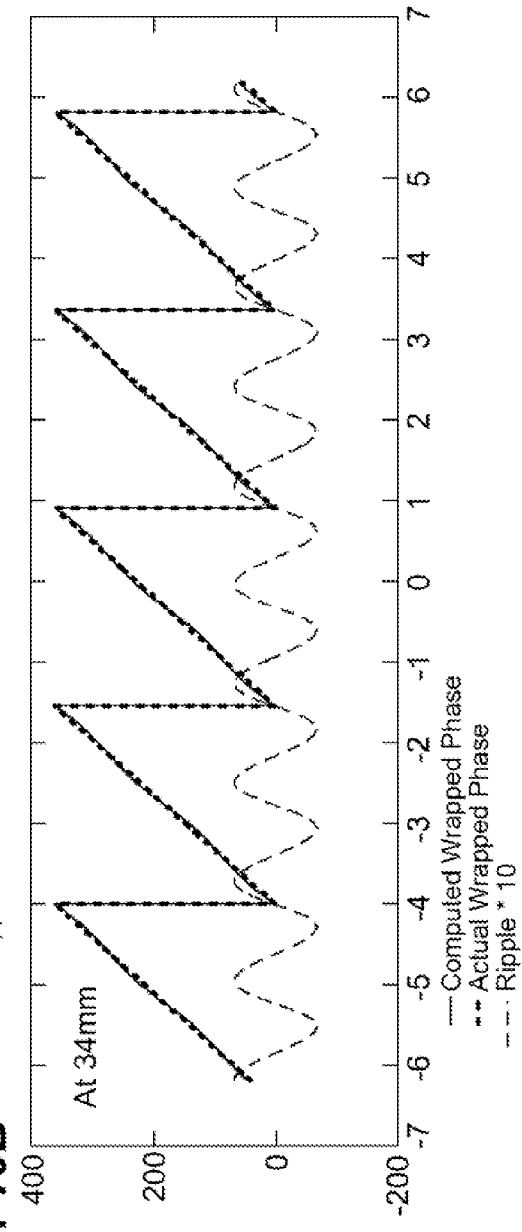
FIG. 10B is the graph at the z value of 34 mm.

FIGS. 10 and 11 are now described in terms of phase ripple. FIG. 10 illustrates an exemplary phase ripple graph along a horizontal intensity line of an exemplary projection set where phase-shift is assumed to equal 120°. The graph of FIG. 10A represents the phase ripple graph at the object distance or z value of 14 mm, and the graph of FIG. 10B represents the phase ripple graph at the z value of 34 mm. In FIG. 10A, the straight, dashed lines represent the curve fit or predicted wrapped phase for the horizontal intensity line at 14 mm, the trace that wobbles along those lines represents the calculated wrapped phase at that same horizontal intensity line at 14 mm, and the sinusoidal dashed trace indicates the ripple magnitude or phase error. Similarly, in FIG. 10B, the straight, dashed lines represent the curve fit or predicted wrapped phase for the horizontal intensity line at 34 mm, the trace that wobbles along those lines represents the calculated wrapped phase at that same horizontal intensity line at 34 mm, and the sinusoidal dashed trace indicates the ripple magnitude or phase error.

Seen in FIGS. 10A and 10B, where a 120° phase-shift is assumed, there is more phase ripple for the calculated wrapped phase at close distance 14 mm than there is for the calculated wrapped phase at far distance 34 mm. This is because at close distances, the actual phase-shift is less than 120°, whereas at far distances the actual phase-shift approaches 120°. Although the phase ripple at 34 mm is less than the phase ripple at 14 mm in FIGS. 10A and 10B, it cannot be confirmed at this point that 34 mm is the correct approximated z value. This is because the phase-shift value of 120°, used to compute wrapped phase for FIGS. 10A and 10B, is merely the assumed phase-shift, not the actual phase-shift.

As discussed above at step 120, the wrapped phase is re-computed using the phase-shift associated with each possible z value to assist in finding the correct approximated z value. FIG. 11 illustrates an exemplary phase ripple graph along the same horizontal intensity line of FIG. 10. However, in FIG. 11, the phase-shift used to compute wrapped phase is the phase-shift computed from exemplary calibration parameters in step 120 at the possible z value of 14 mm, not an arbitrarily chosen phase-shift. In FIG. 11, the computed phase-shift value of 98.5° is used.

Figure 11A:
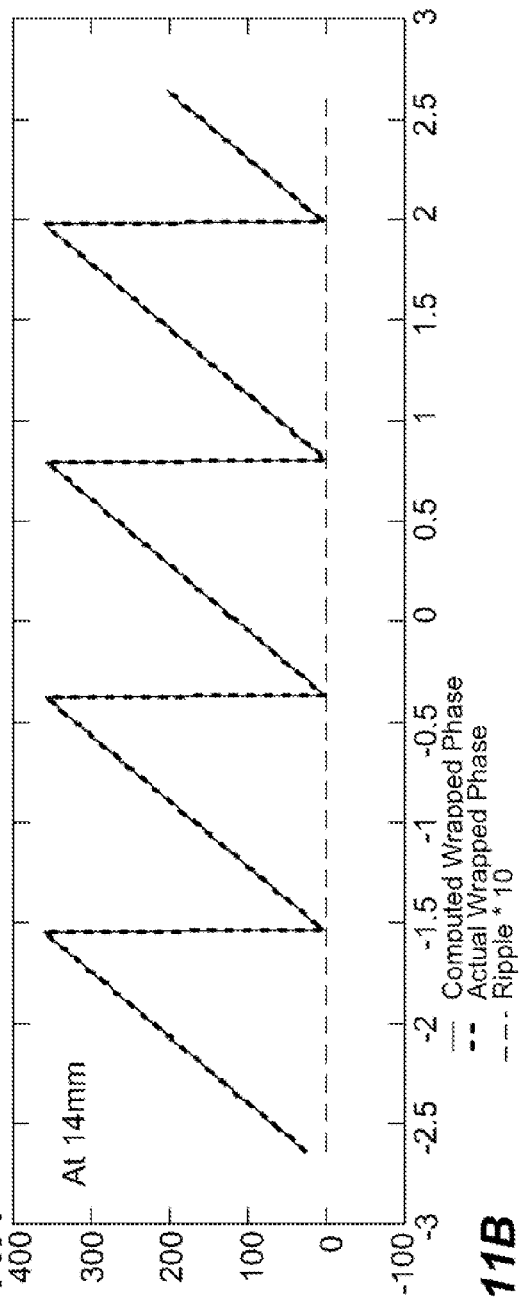
FIG. 11A is the graph at the z value of 14 mm.
Figure 11B:
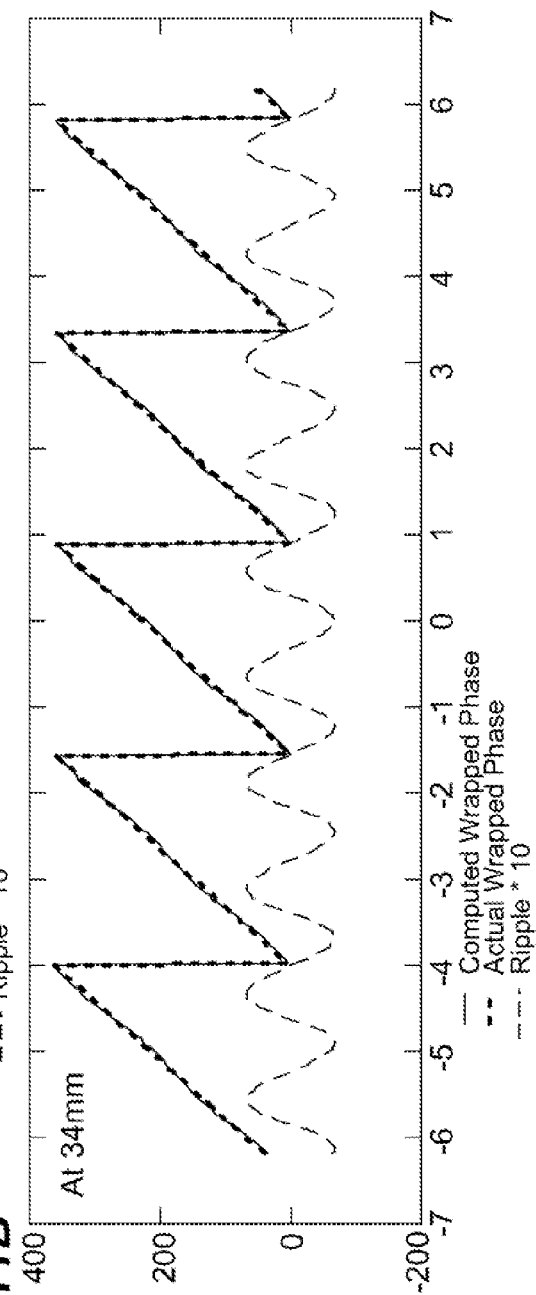
FIG. 11B is the graph at the z value of 34 mm.

The graph of FIG. 11A represents the phase ripple graph at the distance or z value of 14 mm, and the graph of FIG. 11B represents the phase ripple graph at the z value of 34 mm. In FIG. 11A, the thick, straight, dashed lines represent the curve fitted or predicted wrapped phase for the horizontal intensity line at 14 mm and the solid line trace that essentially runs through the predicted wrapped phase trace is the calculated wrapped phase at that same horizontal intensity Sine at 14 mm. The thin, dashed trace along the zero value indicates the ripple magnitude or phase error. In FIG. 11B, the straight, dashed lines represent the curve fitted or predicted wrapped phase for the horizontal intensity line at 34 mm, the trace that wobbles along those lines represents the calculated wrapped phase at that same horizontal intensity line at 34 mm, and the sinusoidal dashed trace indicates the ripple magnitude or phase error. Again, the phase-shift used to compute wrapped phase for FIGS. 11A and 11B is the phase-shift computed for 14 mm, 98.5°.

In FIG. 11A, the computed phase and the predicted phase are essentially identical. Furthermore, the dashed line indicating ripple magnitude in FIG. 11A remains consistently along the zero value. Therefore, the phase ripple at the z value of 14 mm is near zero. In contrast, FIG. 11B shows that phase ripple still exists for the z value of 34 mm, shown by the sinusoidal dashed trace. In view of the graphs of FIG. 11, a lower ripple metric value would clearly be computed at 14 mm than at 34 mm. In this exemplary ease, the distance of 14 mm is the selected approximated z value.

There may be areas of the images that were not included in any line segment. However, to generate a surface z map, it is often desirable to determine a z value for as many pixels as possible. Neighboring data may be used to determine the approximated z values for pixels not included in any line segment. For example, the z values of neighboring pixels and/or information from previous steps such as absolute phase may be used. Furthermore, there may be some pixels for which a z value cannot be reliably determined. Such pixels may be omitted or masked in the final surface z map. Finally, spatial filtering is optionally applied to the surface z map.

Once the z map is determined, the data can be used in many ways. It can be combined with camera parameters such as FOV and optical distortion to generate point cloud data which includes x, y, and z coordinates for a plurality of image points and which may also be spatially filtered. Such data can be used for performing 3D geometric measurements or 3D visualization. It can also be exported or converted to a data format, usable with 3D modeling software for detailed analysis or reverse engineering.

Variations in physical configuration, such as having projected line patterns that appear horizontal or diagonal in the captured images, could be accommodated by embodiments of the present invention. Further, an entire surface map may not always be desired. In some cases small areas on the surface may be mapped while ignoring other portions of the images.

The construction and arrangement of the phase-shift, analysis system and method, as described herein and shown in the appended figures, is illustrative only and is not limited to a probe. Although only a few embodiments of the invention have been described in detail in this disclosure, those skilled in the art who review this disclosure will readily appreciate that many modifications are possible (e.g. variations in sizes, dimensions, structures, shapes and proportions of the various elements, values of parameters, mounting arrangements, use of materials, orientations, etc.) without materially departing from the novel teachings and advantages of the subject matter recited in the appended claims. Accordingly, all such modifications are intended to be included within the scope of the present invention as defined in the appended claims. The order or sequence of any process or method steps may be varied or re-sequenced according to alternative embodiments. In the claims, any means-plus-function clause is intended to cover the structures described herein as performing the recited function and not only structural equivalents but also equivalent structures. Other substitutions, modifications, changes and omissions may be made in the design, operating conditions and arrangement of the preferred and other exemplary embodiments without departing from the spirit of the embodiments of the invention as expressed in the appended claims. Therefore, the technical scope of the present invention encompasses not only those embodiments described above, but also those that fall within the scope of the appended claims.

What is claimed is:

1. A system for determining an object distance z from a reference point to a point on the object surface, the system comprising:
    a plurality of light emitters, wherein a group of at least one of the plurality of light emitters comprises an emitter group, wherein a light pattern projected when one emitter group is emitting comprises a fringe set, wherein the projected light pattern of one fringe set exhibits a phase-shift relative to the projected light patterns of other fringe sets, and wherein the phase-shift varies as the distance from an origin of the plurality of fringe sets varies;

an imager for obtaining at least one image of at least one of the plurality of fringe sets projected onto the object surface; and a processing unit that is configured to compute a ripple metric value associated with each of a plurality of possible object distance z values and determine an approximated object distance z value using the computed ripple metric values.

2. The system of claim 1, wherein:

the projected light pattern comprising each of the plurality of fringe sets comprises a structured-light pattern of parallel light and dark lines; and wherein the parallel light and dark lines comprise sinusoidal intensity profiles.

3. The system of claim 1, wherein the projected light pattern of one fringe set is projected onto the object per image.

4. The system of claim 1, wherein the processing unit is further configured to:

plug pixel coordinates from the at least one image into a curve fit equation that predicts phase at a given pixel coordinate.

5. The system of claim 1, wherein the processing unit is further configured to:

section usable pixels from the at least one image into line segments;

use neighboring data to determine approximated object distance z values for pixels not included in a line segment.

6. The system of claim 1, wherein the processing unit is further configured to compute wrapped phase associated with each of the plurality of possible object distance z values.

7. The system of claim 6, wherein the processing unit is further configured to: perform a curve fit for each of the plurality of possible object distance z values to define an equation that predicts phase values, wherein computing a ripple metric value comprises determining a difference between the predicted phase values and computed phase values, and wherein the computed phase values are derived from the computed wrapped phase associated with each of the plurality of possible object distance z values.

8. The system of claim 6, wherein:

computing a ripple metric value comprises performing a frequency-domain analysis on computed phase values wherein the computed phase values are derived from the computed wrapped phase associated with each of the plurality of possible object distance z values.

9. The system of claim 1, wherein the processing unit is further configured to generate a surface z map.

10. The system of claim 1, wherein the processing unit is further configured to perform geometric measurements.

11. A probe system comprising:
an insertion tube;
at least one emitter module;
an imager; and
a processing unit,
wherein the probe system is configured to:
project a plurality of fringe sets from the at least one emitter module onto an object surface wherein a projected light pattern of one fringe set exhibits a phase-shift relative to the projected light patterns of the other fringe sets, and wherein the phase-shift varies as the distance from an origin of the plurality of fringe sets varies;
obtain at least one image of at least one of the plurality of fringe sets projected onto the object surface;
compute a ripple metric value associated with each of a plurality of possible object distance z values, where an object distance z is determined from a reference point to a point on the object surface; and
determine an approximated object distance z value using the computed ripple metric values.

12. The probe system of claim 11, wherein the projected light patterns comprise structured-light patterns of parallel light and dark lines, and wherein the parallel light and dark lines comprise sinusoidal intensity profiles.

13. The probe system of claim 11, further configured to:
determine an absolute phase associated with each of the plurality of possible object distance z values and limit the number of possible object distance z values by determining which absolute phase values are possible considering probe geometry.

14. The probe system of claim 11, further configured to:
project a first projection set comprising at least one fringe set from one side of a field of view and project a second projection set comprising at least one of fringe set from the other side of the field of view.

15. The probe system of claim 11, wherein:
the at least one emitter module comprises a plurality of light emitters;
wherein a group of at least one of the plurality of light emitters comprises an emitter group, and wherein a fringe set comprises the light pattern projected when one emitter group is emitting; and
wherein the at least one emitter module is disposed on the insertion tube.

16. The probe system of claim 15, wherein the at least one emitter module comprises a line grating, and wherein the each of the at least one of the plurality of light emitters comprising an emitter group are spaced apart along the axis perpendicular to lines on the line grating by a distance equal to an integer number of periods of the line grating.

17. The probe system of claim 15, wherein the plurality of light emitters comprise light emitting diodes.

18. A method for determining an object distance z from a reference point to a point on the object surface, the method comprising:
projecting the plurality of fringe sets onto an object surface wherein a projected light pattern of one fringe set exhibits a phase-shift relative to the projected light patterns of the other fringe sets, and wherein the phase-shift varies as the distance from an origin of the plurality of fringe sets varies;
capturing at least one image of at least one of the plurality of fringe sets projected onto the object surface; and
determining an approximated object distance z value using a computed ripple metric value.

19. The method of claim 18, wherein one fringe set is projected onto the object per image.

20. The method of claim 18, further comprising:
projecting a first projection set comprising at least one fringe set from one side of a field of view and projecting a second projection set comprising at least one of fringe set from the other side of the field of view.

* * * * *

UNITED STATES PATENT AND TRADEMARK OFFICE
CERTIFICATE OF CORRECTION

| | | |
|---|---|---|
| PATENT NO. | : 7,969,583 B2 | Page 1 of 1 |
| APPLICATION NO. | : 12/042800 | |
| DATED | : June 28, 2011 | |
| INVENTOR(S) | : Bendall et al. | |

It is certified that error appears in the above-identified patent and that said Letters Patent is hereby corrected as shown below:

On the Title Pg, Item (74), under "Attorney, Agent, or Firm", Line 2, delete "Conkin" and insert -- Conklin --, therefor.

In Column 6, Line 32, delete "Sight" and insert -- light --, therefor.

In Column 13, Line 52, delete "Sine" and insert -- line --, therefor.

In Column 14, Line 4, delete "ease," and insert -- case, --, therefor.

In Column 14, Line 33, delete "phase-shift," and insert -- phase-shift --, therefor.

Signed and Sealed this
Eighth Day of November, 2011

David J. Kappos
*Director of the United States Patent and Trademark Office*